United States Patent [19]
Bay et al.

[11] Patent Number: 5,600,954
[45] Date of Patent: Feb. 11, 1997

[54] TRACTOR HYDRAULIC RESERVOIR HEATING ELEMENT

[75] Inventors: Tod A. Bay, Denver, Pa.; Clinton B. Stroh, Portage, Mich.

[73] Assignee: New Holland North America, Inc., New Holland, Pa.

[21] Appl. No.: 318,318

[22] Filed: Oct. 5, 1994

[51] Int. Cl.⁶ .............. F16D 31/02; B01D 24/00
[52] U.S. Cl. .............. 60/454; 210/184; 210/185
[58] Field of Search .............. 60/453, 454, 329; 210/167, 172, 171, 185, 184

[56] References Cited

U.S. PATENT DOCUMENTS

| | | | |
|---|---|---|---|
| 3,411,293 | 11/1968 | Akins | 60/454 |
| 3,998,738 | 12/1976 | Kusay | 210/185 X |
| 4,035,300 | 7/1977 | Stapleton et al. | 210/172 |
| 4,053,409 | 10/1977 | Kuhfuss | 210/172 X |
| 4,502,955 | 3/1985 | Schaupp | 710/184 X |
| 4,510,051 | 4/1985 | Diry | 710/185 X |
| 4,988,372 | 1/1991 | Meline | 210/185 X |

*Primary Examiner*—Hoang Nguyen
*Attorney, Agent, or Firm*—Larry W. Miller; John W. Stader; Frank A. Seemar

[57] ABSTRACT

A heating element for the reservoir of the hydraulic system of an agricultural tractor is disclosed wherein the heating element is positioned within the interior of the inlet screen member. The heating element is formed with a threaded portion cooperable with the threaded opening of the screen member to permit mounting of the screen member directly on heating element, which in turn is threadably received in the interior wall of the hydraulic system reservoir. The screen member is sealed against the heating element to prevent the leakage of hydraulic fluid into the interior of the screen member. The heating element can be replaced with a stationary stud and sealed against the reservoir wall to allow the mounting of the screen member without utilization of the heating element.

3 Claims, 3 Drawing Sheets

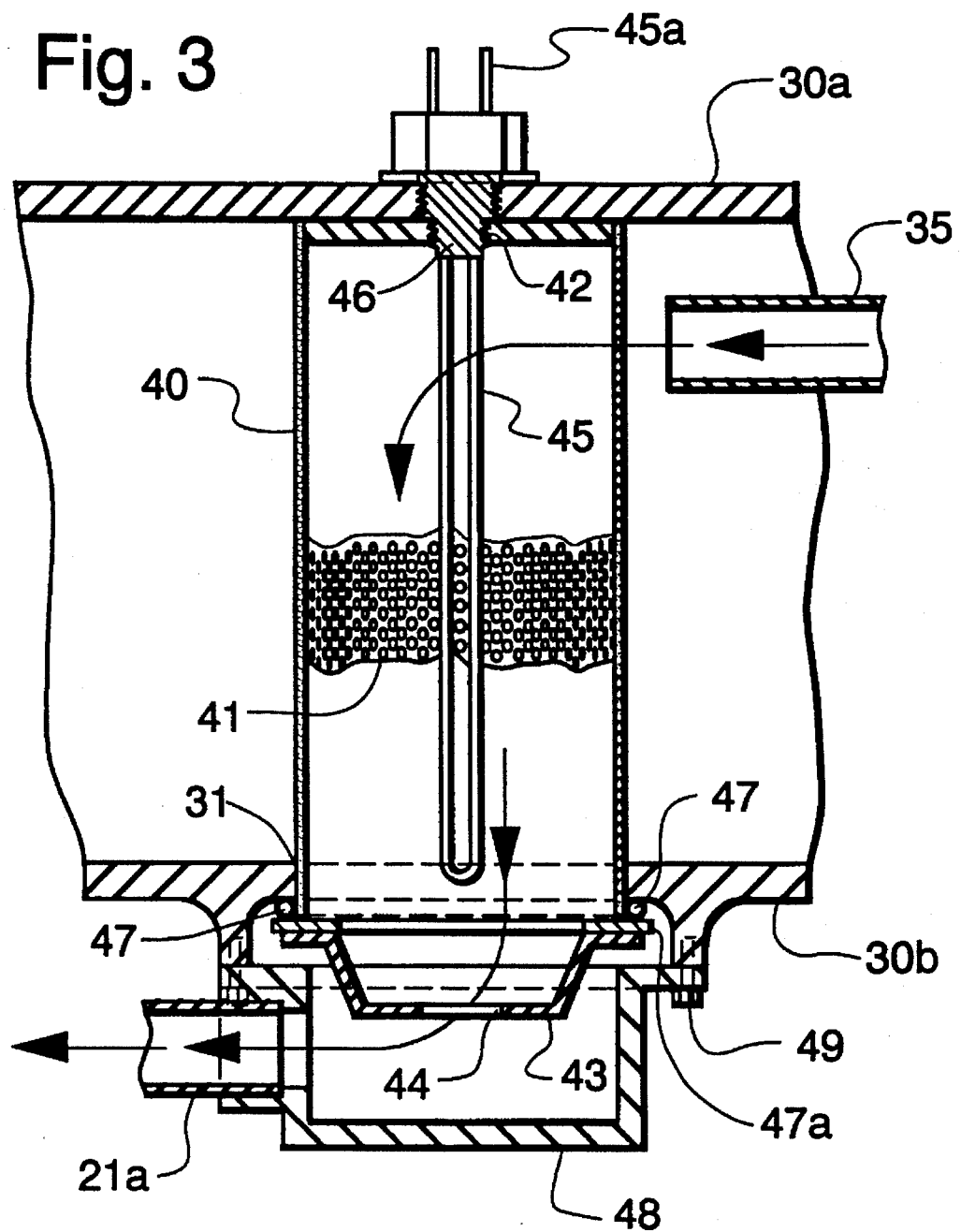

5,600,954

TRACTOR HYDRAULIC RESERVOIR HEATING ELEMENT

BACKGROUND OF THE INVENTION

This invention relates generally to off-road motor vehicles, such as tractors, and more particularly, to a closed center hydraulic system providing hydraulic power for operating the tractor steering mechanism, the three-point lift mechanism and the remote directional valves for operatively powering implements coupled to the tractor.

Agricultural tractors are typically provided with a plurality of directional remote valves for the connection of hydraulic lines thereto for the operative powering from the tractor's hydraulic system the hydraulic components of an implement attached to the tractor. The tractor hydraulic system is also utilized to provide hydraulic power for the operation of certain on-board hydraulic components, such as the tractor's steering mechanism and the three-point lift linkage. The various hydraulically powered components require different demands on the hydraulic system, which must be configured to adapt to the different hydraulic demands.

Within the tractor on-board hydraulic system, and also within the hydraulic components driven from the tractor on-board hydraulic system, are mechanical devices, such as gears, that can become damaged during their operation. When such devices are damaged, metal chips typically enter the flow of hydraulic fluid and can contaminate other mechanical devices, causing further damage and additional contamination of the hydraulic system. Filters and screens are normally provided within the flow path of hydraulic fluid within the system to remove such contaminates. The servicing of hydraulic system filters and screens is often cumbersome due to the location of the screens, which is particularly true with agricultural tractors.

The reservoir or sump for the hydraulic system on agricultural tractors is usually located within the center gear hosing for the rear drive axle, so as to provide lubrication for the drive gears transferring rotational power from the drive shaft operably driven from the engine to the rear drive wheels of the tractor, as well as provide a large reservoir for the hydraulic system. It would be desirable to provide a screen mechanism for the removal of large contaminates from the hydraulic system of an agricultural tractor that facilitates the installation and removal of the screen member.

When the tractor is operated in cold weather conditions, the start-up of the tractor engine and the resultant need to have hydraulic pressure within the tractor on-board hydraulic system can result in damage to the system components. The low ambient temperatures cause the hydraulic fluid to thicken, which increases the resistance the fluid has to passing through filters. As a result, some of the filters can be bypassed over a pressure relief line, allowing contaminants to bypass the filter and flow through the hydraulic system where damage could occur. Accordingly, it would be desirable to provide a reservoir heater operatively associated with the intake of hydraulic fluid from the reservoir.

SUMMARY OF THE INVENTION

It is an object of this invention to overcome the aforementioned disadvantages of the prior art by providing an easily accessible screen member and heating element associated therewith for the hydraulic system for tractors.

It is another object of this invention to provide a more convenient method of servicing the screen for the on-board tractor hydraulic system.

It is an advantage of this invention that the screen member can be easily access from externally of the hydraulic reservoir.

It is a feature of this invention that the screen maintains a static seal between the filtered and unfiltered hydraulic fluid within the hydraulic system reservoir.

It is another feature of this invention that the screen member is formed with a threaded opening to be mounted on a stationary stud fixed to the wall of the reservoir.

It is another advantage of this invention that the screen member is sealed against the stationary stud by a sealing washier and thread sealant between the mating threads of the screen member and the stationary stud.

It is still another advantage of this invention that the screen member is sealed against the reservoir wall opposite the stationary stud mounting to provide a static seal allowing the withdrawal of filtered hydraulic from the interior of the screen member.

It is still another feature of this invention that the screen member is provided with a handle to facilitate a rotation of the screen member for mounting thereof on the stationary stud.

It is yet another feature of this invention that the handle of the screen member is provided with a square hole therethrough for engagement with a ratchet head to effect a rotation of the screen member.

It is yet another advantage of this invention that the inlet screen member is provided with a heating element to effect a warming of the first hydraulic fluid to be drawn through the hydraulic system.

It is yet another feature of this invention that the heating element is formed with a threaded portion for the mounting of the inlet screen member directly on the heating element.

It is a further advantage of this invention that the heating element is located on the interior of the inlet screen member.

It is a further object of this invention to provide a screen member and an associated heating element for the hydraulic system of an agricultural tractor which is durable in construction, inexpensive of manufacture, carefree of maintenance, facile in assemblage, and simple and effective in use.

These and other objects, features and advantages are accomplished according to the instant invention by providing a heating element for the reservoir of the hydraulic system of an agricultural tractor is disclosed wherein the heating element is positioned within the interior of the inlet screen member. The heating element is formed with a threaded portion cooperable with the threaded opening of the screen member to permit mounting of the screen member directly on heating element, which in turn is threadably received in the interior wall of the hydraulic system reservoir. The screen member is sealed against the heating element to prevent the leakage of hydraulic fluid into the interior of the screen member. The heating element can be replaced with a stationary stud and sealed against the reservoir wall to allow the mounting of the screen member without utilization of the heating element.

BRIEF DESCRIPTION OF THE DRAWINGS

The advantages of this invention will be apparent upon consideration of the following detailed disclosure of the invention, especially when taken in conjunction with the accompanying drawings wherein:

FIG. 3 is a partial cross-sectional view through the hydraulic system reservoir taken along lines 3—3 of FIG. 1 to better depict the details of the heating element and screen member, portions of the screening material being broken away for purposes of clarity.

DETAILED DESCRIPTION OF THE PREFERRED EMBODIMENT

Figure 1:
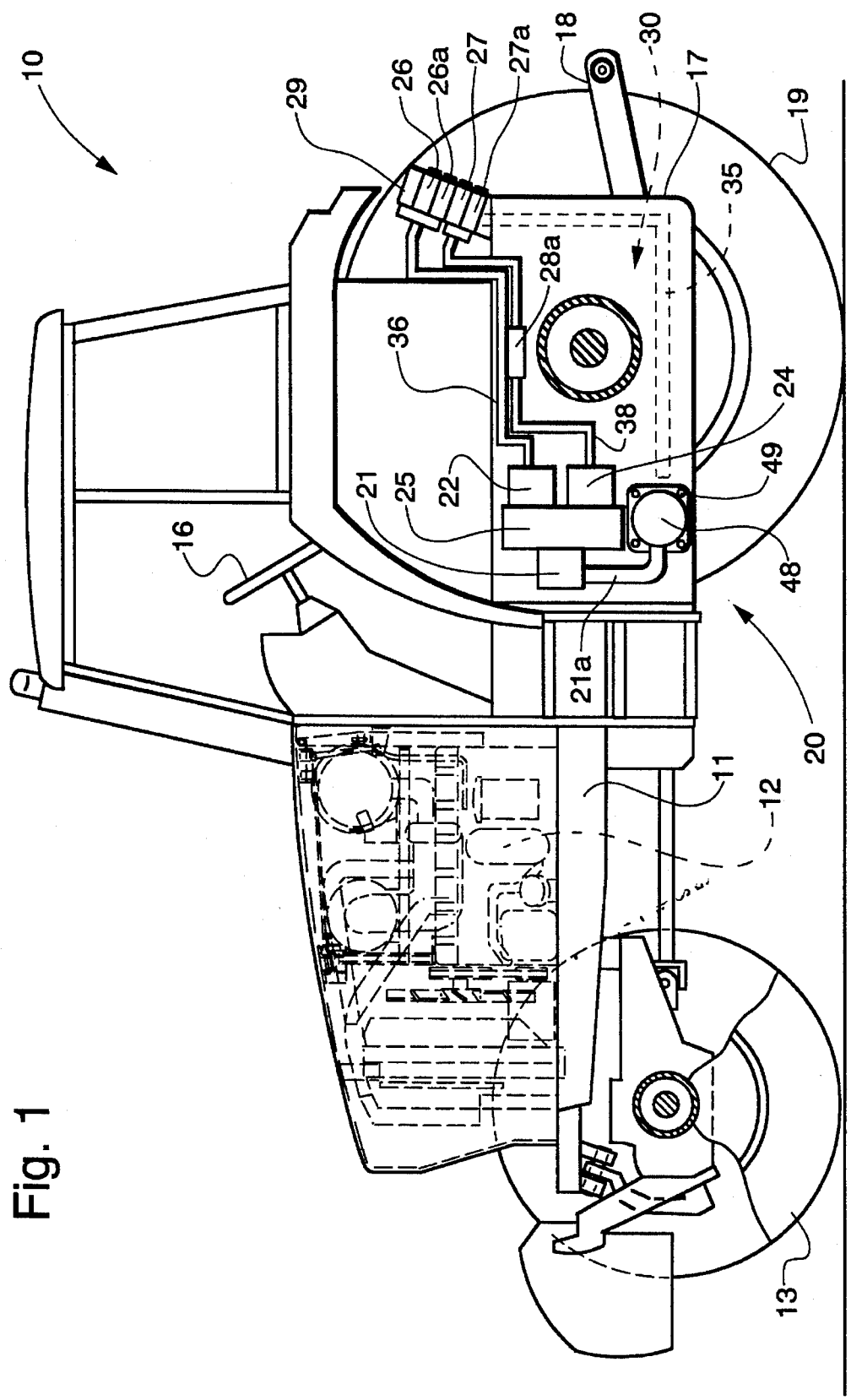
FIG. 1 is a side elevational view of a tractor incorporating the principles of the instant invention, the front and rear wheels being broken away for purposes of clarity, the engine being depicted in broken lines.

Referring now to the drawings and, particularly, to FIG. 1, a representative view of an agricultural tractor incorporating the principles of the instant invention can best be seen. Left and right references are used as a matter of convenience and are determined by standing at the rear of the tractor and facing the forward end in the normal direction of travel. The tractor 10 includes a chassis 11 supported above the ground G in a conventional manner by forward steerable wheels 13 and rearward drive wheels 19 rotatably mounted in a customary transversely spaced orientation and houses a conventional engine 12 serving to provide operational power for the tractor 10 and an operator's cab 15 positioned in an elevated location from which an operator can control the operation of the tractor 10. The operator's cab 15 includes a steering wheel 16 to operate the steering of the front wheels 13 in a known manner through hydraulic steering cylinders (not shown).

Referring now to all the Figs., the tractor on-board hydraulic system 20 is located adjacent the rear drive wheels 19 of the tractor 10 and includes a constant displacement, gear driven charge pump 21 and a pair of closed center, load sensing, variable displacement piston pumps 22, 24 all driven in a conventional manner from the engine 12. The drive gear casing 25 for these pumps 21, 22 and 24 contain a drive gear train (not shown) to provide the desired flow of hydraulic fluid. The gear driven charge pump 21 will provide a sufficient flow to satisfy the maximum requirements of both the piston pumps 22, 24, which are preferably sized to provide flows of approximately 25 and 32 gallons per minute, respectively.

The tractor 10 is provided with a plurality of conventional remote directional valves 26, 26a, 27 and 27a, which are provided with couplings preferably of the quick-attach variety, for the connection of hydraulic devices to be powered from the tractor hydraulic system 20. Exemplary of such remote hydraulic devices would be implements (not shown) attached in a conventional manner to the rear of the tractor 10 to be towed thereby. Such implements typically have hydraulic cylinders (not shown) or hydraulic motors (not shown) for operating a particular function of the implement. These hydraulic cylinders or motors would be connected via one or more of the remote valves 26, 26a, 27 or 27a to receive a supply of hydraulic fluid under pressure for powering the operation of the device.

The tractor 10 also includes hydraulically driven devices to be powered from the on-board hydraulic system 20. For example, the conventional steering mechanism (not shown) which is actuated by a turning of the steering wheel 16 can effect a pivotal movement of the front steering wheels 13 via a hydraulic steering cylinder (not shown). For a more detailed description of the steering mechanism, reference can be had to U.S. Pat. No. 5,312,124, issued on May 17, 1994, to G. W. Linde, et al, the descriptive portions of which are incorporated herein by reference. The flow of hydraulic fluid to the steering cylinder (not shown) is controlled through a steering valve 28, which is operatively connected to the steering wheel 16.

The three-point hitch mechanism 18 of the tractor 10 is a further example of a hydraulic device powered by the on-board hydraulic system 20. While the three-point hitch mechanism 18 is conventional, the operation thereof can be controlled by a microprocessor (not shown) as described in U.S. Pat. No. 5,320,186, issued on June 14, 1994, to R. P. Strosser, et al, the descriptive portions of which are incorporated herein by reference. The hydraulic demands of the electronic three-point hitch control mechanism 18 are provided through a separate hydraulic valve 29, which can be referred to as the electronic draft control (EDC) valve 29.

The horsepower requirements of any particular load imposed on the hydraulic system is directly proportional to the product of the of the flow and pressure requirements of the imposed load. Typically, a hydraulic device will require high hydraulic pressure, but only low flow requirements. Other hydraulic devices will require a lower hydraulic pressure, but a large flow of hydraulic fluid. Of the on-board hydraulic mechanisms described above, the electronically controlled three-point hitch mechanism 18 requires a relatively high hydraulic pressure to operate, but generally does not require much flow as the adjustments made by the electronic system are normally rather minute and does not generally require a large displacement of hydraulic fluid. The steering mechanism has different requirements as the steering cylinder may require considerable displacement for its operation, but a lower hydraulic operating pressure is utilized.

Figure 2:
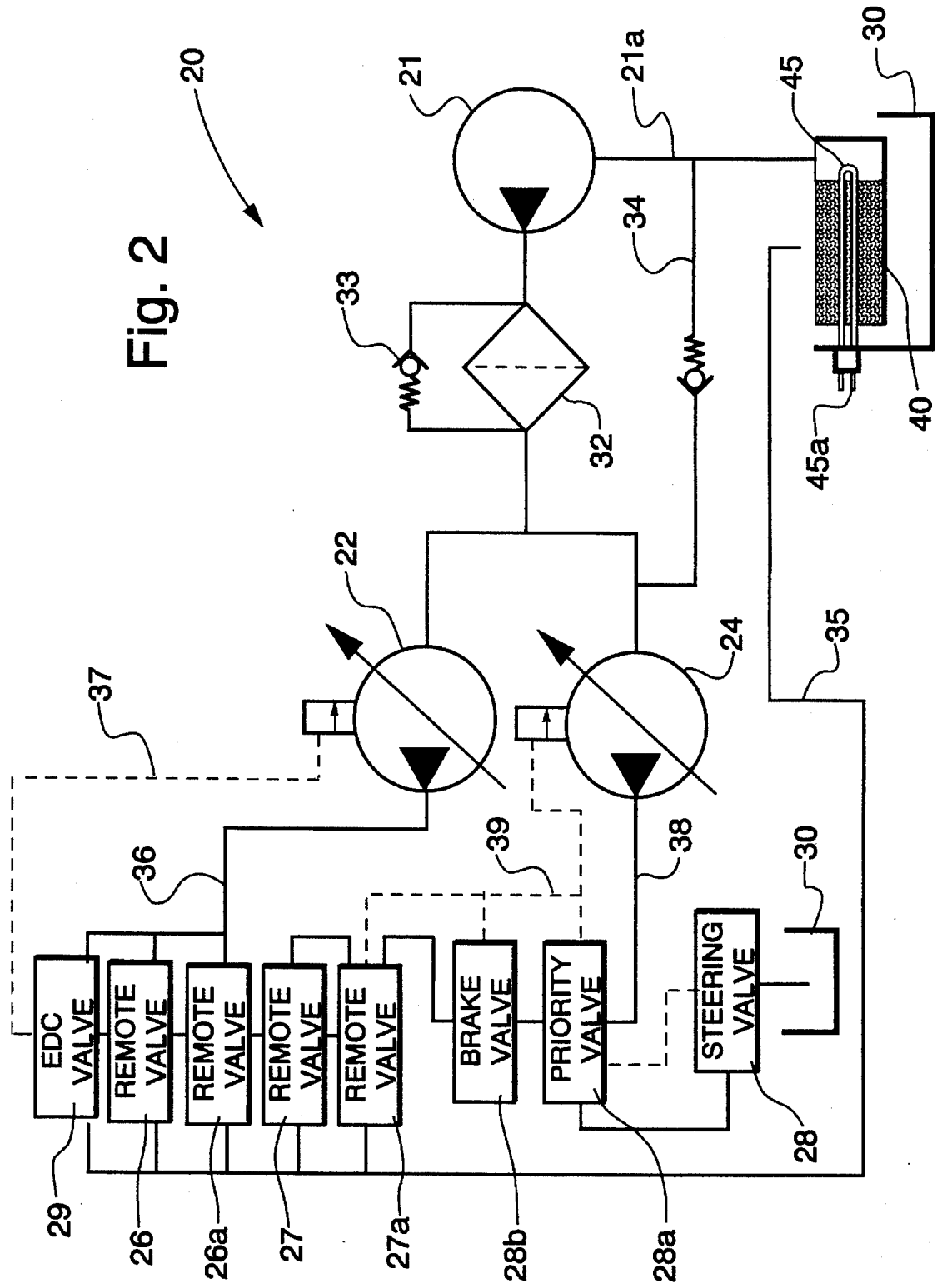
FIG. 2 is a schematic diagram representing the hydraulic system incorporating the principles of the instant invention.

Referring now to FIGS. 1 and 2, but primarily FIG. 2, the hydraulic system 20 can be seen in greater detail. The charge pump 21 supplies a substantially constant supply of hydraulic fluid from a reservoir 30 through a filter 32, or through a pressure relief valve 33 in the event the filter 32 becomes clogged, to the variable displacement piston pumps 22, 24. A re-circulating line 34 allows the return of excess hydraulic fluid to the charge pump 21. The upper piston pump 22 provides a supply of fluid through the supply line 36 to the remote valves 26, 26a and to the EDC valve 29 with a return line 35 returning the flow of hydraulic fluid back to the reservoir 30. A conventional load sensing line 37 operatively interconnecting the valves 26, 26a and 29 controls the variable displacement of the piston pump 22 in a conventional manner. In general terms, the demand for hydraulic fluid is sensed by the pump 22 through the load sensing line 37 and varies the stroke of the piston pump accordingly to increase the flow therefrom.

The lower piston pump 24 supplies hydraulic fluid under pressure through the supply line 38 to a priority valve 28a, which diverts hydraulic fluid to the steering valve 28 when demanded, and then to an optional trailer brake valve 28b and the remote directional valves 27, 27a. The return line 35 also directs the return flow of fluid from the lower pump 24 back to the reservoir 30. As with the upper piston pump 22, a load sensing line 39 conveys the demand for hydraulic fluid flow to the lower pump 24 which increases displacement accordingly in a conventional manner.

For proper utilization of the above-described dual pump hydraulic system 20, the operator should group his remote hydraulic devices according to high pressure/low flow and low pressure/high flow categories. The remote hydraulic devices requiring high pressure, but low flow, should be connected to the remote valves 26 or 26a associated with the upper piston pump 22. Likewise, the low pressure, but high flow, hydraulic devices should be connected to the remote valves 27 or 27a associated with the lower piston pump 24. Each respective piston pump 22, 24 will provide hydraulic fluid under pressure as demanded by the respective devices, while each pump 22, 24 can operate at maximum efficiency without having to satisfy both high pressure and high flow requirements. As a result, less heat is generated within the hydraulic system and lower cooling capability needs to be provided.

For those hydraulic devices requiring a greater flow of hydraulic fluid than either of the piston pumps 22, 24 can individually provide, such as a large hydraulic orbit motor, the operator can interconnect the couplings of one of the remote valves 26, 26a associated with the upper piston pump 22 and the couplings of one of the remote valves 27, 27a associated with the lower piston pump 24 by a secondary coupling device (not shown) to combine the flows from both pumps 22, 24 into a single hydraulic line. This secondary coupling device would connect externally to each of the respective groups of remote valves 26, 27. As a result, the hydraulic system 20 can provide a maximum total flow of approximately 57 gallons per minute.

Referring to FIGS. 1–3, the reservoir 30 is preferably the center housing 17 for the rear wheels 19 in which is located the drive gears (not shown) from transferring rotational power from the engine 12 to the rear wheels 19 for driving the mobile operation of the tractor 10. By using the center housing 17, the drive gears will have a readily available supply of fluid for lubricating the interengagement of the drive gears. The reservoir 30 has laterally opposing structural walls 30a, 30b defining the lateral width of the reservoir 30. One of the walls 30a is provided with a heating element 45 threadably received within the wall 30a for mounting the screen member 40 in a manner defined in greater detail below. The opposing wall 30b is formed with an access opening 31 for entry into the reservoir 30.

The hydraulic system 20 is also provided with a screen member 40 preferably formed in a cylindrical shape from screening material 41. The screen member 40 is formed with a threaded opening 42 at one end for engagement with a threaded receiving portion 46 of the heating element 45 for the mounting of the screen member 40 in its operative position. The screen member 40 is also provided with an opposing handle 43 preferably formed as a loop extending outwardly away from the screening material 41. The handle 43 can be formed with an optional square hole 44 stamped into the handle 43 to allow engagement therewith by a standard ½ inch drive ratchet head to rotate the screen member 40 mechanically.

For mounting, the cover member 48 is removed from the reservoir wall 30b by first removing the fasteners 49 and then the screen member 40 is inserted through the exposed access opening 31 with the heating element 45 passing through the threaded opening 42 until becoming engaged with the threaded receiving portion 46 of the heating element 45 on the opposing wall 30a. By rotating the screen member 40, the screen member 40 will advance along the threaded receiving portion 46 until becoming pressed against the reservoir wall 30a with the handle 43 projecting externally of the reservoir wall 30b.

A conventional thread sealant (not shown) placed on the threaded receiving portion 46 before engaging the screen member 40, or an alternative sealing member (not shown) located between the screen member 40 and the wall 30a, will prevent hydraulic fluid from leaking past the threaded receiving portion 46 to the interior of the screen member 40. Once the screen member 40 is properly positioned and tightened against the wall 30a, an O-ring seal 47 compressed between a flange 47a affixed to the screen member 40 and the outside of the reservoir wall 30b prevents leakage of hydraulic fluid through the access opening 31 between the screen member 40 and the wall 30b.

The return line 35 is routed through the reservoir 30 to terminate adjacent the screen member 40 such that the hydraulic fluid returning therethrough is directed immediately onto the screening material 41. In this manner, the contaminates are best filtered from the flow of hydraulic fluid. The intake line 21a draws hydraulic fluid from the interior of the screen member 40 to the charge pump 21. All hydraulic fluid being recirculated back through the charge pump 21 is then filtered immediately before being drawn into the intake line 21a.

The heating element 45, positioned in the interior of the intake screen member 40, is operable to immediately heat the hydraulic fluid to be initially drawn into the intake line 21a for introduction to the charging pump 21. Since the intake line 21a draws hydraulic fluid from the lowest point of the reservoir 30, the location of the heating element 45 within the intake screen member insures that the first hydraulic fluid pumped from the reservoir 30 will be warm. A conventional switch (not shown) operatively connected to the tractor's electrical system, which in turn provides a source of heat to the heating element through the electrical connection 45a thereof, will control the operation of the heating element.

In situations where the heating element 45 is not needed, e.g. where the ambient temperature is not sufficiently low as to thicken the hydraulic fluid, the heating element can be replaced with a threaded stationary stud (not shown) and the screen member 40 mounted thereon instead of on the receiving portion of the heating element. The structure and method of using the stationary stud is described in the commonly owned and co-pending application entitled "Inlet Screen for Tractor Hydraulic System", filed concurrently herewith and assigned U.S. patent application Ser. No. 08/318,306, the descriptive portions of which are incorporated herein by reference.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a tractor having a wheeled chassis adapted for movement over the ground; an engine supported on said chassis for providing operative power for said tractor; and a hydraulic system operably powered by said engine and having a plurality of remote couplers supported from said chassis for remote connection thereto, said hydraulic system further including a reservoir having first and second spaced-apart walls, a pump drawing hydraulic fluid through an intake line from said reservoir to provide a flow of hydraulic fluid under pressure to the remote couplers, and a return line to return hydraulic fluid from said remote couplers to said reservoir, the improvement comprising:

an intake screen member mounted in said reservoir in operative association with said intake line to screen hydraulic fluid prior to being drawn into said intake line;

a heating member mounted on said first reservoir wall and projecting outwardly therefrom into said reservoir, said heating member being positioned on an intake side of said intake screen so that hydraulic fluid can be heated after passing through said screen member and before being drawn through said intake line, said intake screen member being mounted on said heating member.

2. The tractor of claim 1 wherein said heating member includes a threaded receiving portion, said screen member being formed with a threaded hole therein to mate with said receiving portion.

3. The tractor of claim 2 wherein said screen member is cylindrical in shape, said heating member being oriented concentrically within said screen member.

* * * * *